United States Patent
Kim et al.

(10) Patent No.: US 8,745,495 B2
(45) Date of Patent: Jun. 3, 2014

(54) MOBILE TERMINAL AND METHOD OF CONTROLLING OPERATION OF THE MOBILE TERMINAL

(75) Inventors: Sang Soo Kim, Seoul (KR); Rae Hoon Kang, Seoul (KR); Ha Yang Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 616 days.

(21) Appl. No.: 12/361,104

(22) Filed: Jan. 28, 2009

(65) Prior Publication Data

US 2010/0005347 A1 Jan. 7, 2010

(30) Foreign Application Priority Data

Jul. 2, 2008 (KR) ........................ 10-2008-0064041

(51) Int. Cl.
*G06F 3/048* (2013.01)
(52) U.S. Cl.
USPC ........... 715/715; 709/218; 709/231; 709/203; 709/224
(58) Field of Classification Search
USPC .......................... 715/715, 733, 711; 709/224
See application file for complete search history.

(56) References Cited

U.S. PATENT DOCUMENTS

| | | | |
|---|---|---|---|
| 7,747,706 B2 * | 6/2010 | Ran | 709/219 |
| 2002/0029089 A1 * | 3/2002 | Ueda | 700/94 |
| 2002/0029252 A1 | 3/2002 | Segan et al. | |
| 2002/0063679 A1 * | 5/2002 | Goodwin et al. | 345/156 |
| 2003/0058273 A1 * | 3/2003 | Keohane et al. | 345/739 |
| 2003/0061110 A1 | 3/2003 | Bodin | |
| 2005/0125558 A1 * | 6/2005 | Holden et al. | 709/242 |
| 2007/0167174 A1 * | 7/2007 | Halcrow et al. | 455/456.2 |
| 2008/0077474 A1 * | 3/2008 | Dumas et al. | 705/10 |
| 2008/0077656 A1 * | 3/2008 | Broda | 709/203 |
| 2008/0108330 A1 * | 5/2008 | O'Neil et al. | 455/414.1 |
| 2008/0108341 A1 * | 5/2008 | Baard | 455/418 |
| 2008/0312987 A1 * | 12/2008 | Damodaran et al. | 705/7 |

FOREIGN PATENT DOCUMENTS

WO    WO 02/97636    5/2002

OTHER PUBLICATIONS

Cybernet (Ryan), CyberNotes: Minimize Windows to Thumbnails (Oct. 30, 2007), http://cybernetnews.com/cybernotes-minimize-windows-to-thumbnails/.*
Gert, Internet Explorer cannot display the webpage, ( Sep. 21, 2007) http://developing-your-web-presence.blogspot.com/2007/09/internet-explorer-cannot-display.html.*
Cheah Chu Yeow, Firefox Secrets (Jun. 2005).*
Bart G. Farkas, The BlackBerry Pearl Pocket Guide (Nov. 13, 2006).*

* cited by examiner

*Primary Examiner* — Amy Ng
*Assistant Examiner* — Di Xiao
(74) *Attorney, Agent, or Firm* — KED & Associates LLP

(57) ABSTRACT

A method of controlling a mobile terminal is provided. The method may include displaying an icon on the mobile terminal indicating that at least one access-failed website is currently accessible by the mobile terminal. The at least one access-failed website may be a website that the mobile terminal previously failed to access. In response to selection of the icon displayed on the mobile terminal, a website list may be displayed on the mobile terminal. The website list may include information of the access-failed website that is currently accessible.

27 Claims, 16 Drawing Sheets (a)　　　　　　　　　　(b)

(a)　　　　　　　　　　(b)

MOBILE TERMINAL AND METHOD OF CONTROLLING OPERATION OF THE MOBILE TERMINAL

This application claims priority from Korean Patent Application No. 10-2008-0064041, filed Jul. 2, 2008, the subject matter of which is hereby incorporated by reference.

BACKGROUND

1. Field

Embodiments of the present invention may relate to a mobile terminal and method that determine whether a website that the mobile terminal has failed to access is currently accessible.

2. Background

Mobile terminals are portable devices that can provide users with various services such as a voice calling service, a video calling service, an information input/output service, and a data storage service.

As services provided by mobile terminals diversify, an increasing number of mobile terminals may be equipped with complicated functions such as capturing photos or moving pictures, playing music files or moving image files, providing game programs, and receiving broadcast programs. Mobile terminals have evolved into multimedia players.

Attempts have been made to realize such complicated functions as hardware devices or software programs. Additionally, web browsing services involving the use of mobile terminals have become widespread.

Mobile terminals may not always be able to access web servers since the mobile terminals are carried around by their users. Users may not be able to recognize whether websites that the mobile terminal has previously failed to access are currently accessible without checking the websites using web browsers.

Users may not readily recognize whether there is updated information regarding websites of interest or whether a connection error has occurred in the websites of interest without accessing the specific websites of interest.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present invention may provide a mobile terminal that determines whether a website that the mobile terminal has failed to previously access is currently accessible, that provides results of the determination to a user using a website list, and that automatically accesses the website and provides a web page of the website to the user when the website is currently accessible.

A method of controlling operation of a mobile terminal may include when there are one or more access-failed websites, which are websites that the mobile terminal has failed to access, displaying an icon indicating whether the access-failed websites are currently accessible, and when the icon is chosen, displaying a website list including a number of access-failed websites that are currently accessible.

A method of controlling operation of a mobile terminal may include displaying at least one web browser screen, in which a web page provided by a website or an error page is displayed and when the website is accessible when an error page is displayed in the web browser screen, displaying a web page provided by the website in the web browser screen.

A mobile terminal may include a wireless Internet module that accesses a website, a display module that displays an icon indicating whether the access-failed websites are currently accessible when there are one or more access-failed websites. The mobile terminal may also include a controller that controls a display module to display a website list including a number of access-failed websites that are currently accessible when the icon is chosen.

A mobile terminal may include a display module, a wireless Internet module that accesses a website, and a controller that generates a website list including one or more websites. The controller may also control the display module to display an update notice including updated information regarding any one of the websites included in the website list. Still further, the controller may control the display module to display a connection error notice when a connection error occurs in any one of the websites included in the website list.

The term 'mobile terminal' may indicate a mobile phone, a smart phone, a laptop book computer, a digital broadcast receiver, a personal digital assistant (PDA), a portable multimedia player (PMP), or a navigation device.

Figure 1:
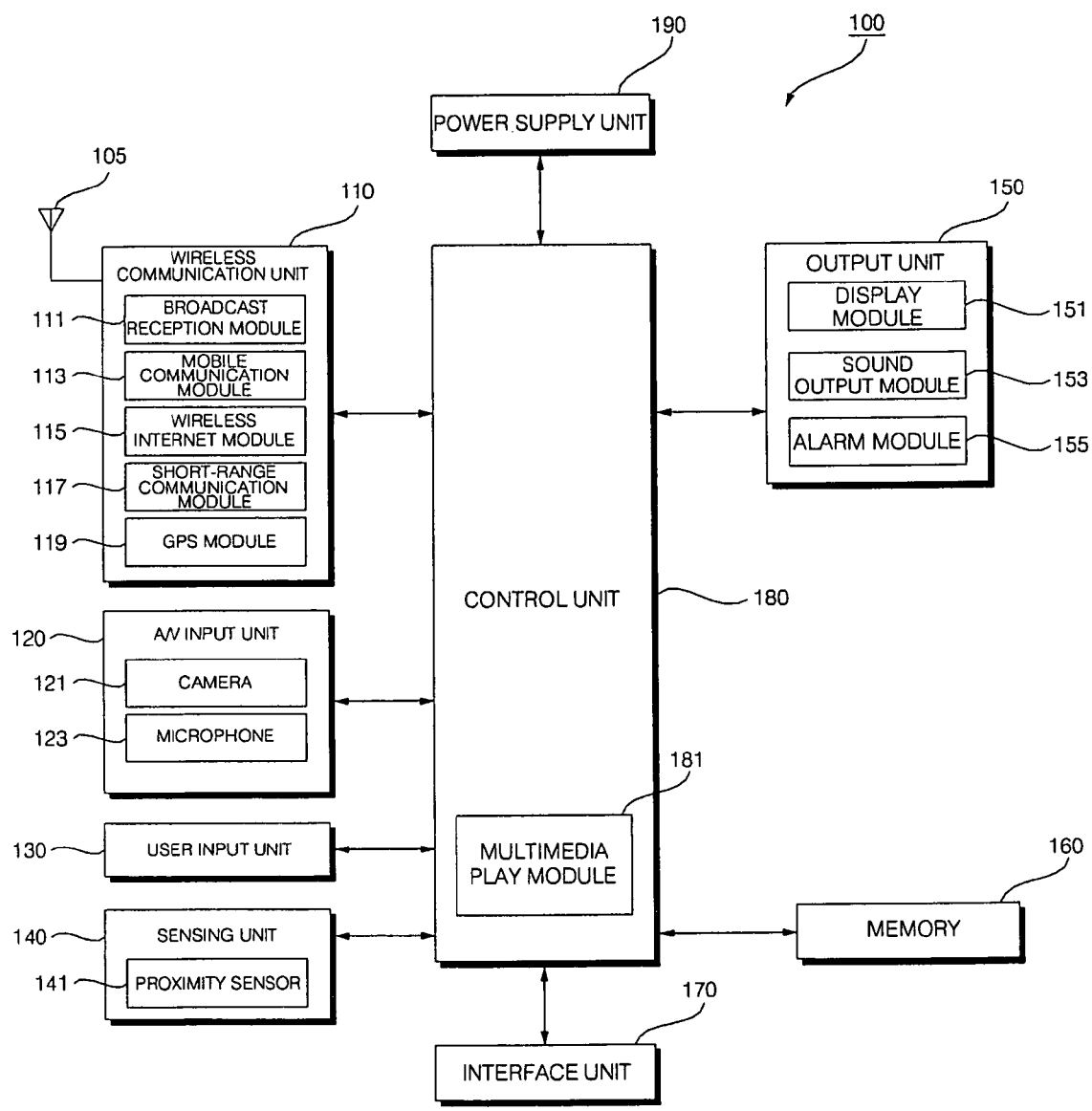
FIG. 1 is a block diagram of a mobile terminal according to an example embodiment of the present invention.

FIG. 1 is a block diagram of a mobile terminal according to an example embodiment of the present invention. Other embodiments and configurations are also within the scope of the present invention.

FIG. 1 shows that a mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the elements of the mobile terminal 100 may be combined into a single unit or component, or a single unit or component may be divided into two or more smaller units.

The wireless communication unit 110 may include a broadcast reception module 111, a mobile communication module 113, a short-range communication module 117, a wireless Internet module 115 and a global positioning system (GPS) module 119.

The broadcast reception module 111 may receive broadcast signals and/or broadcast-related information from an external broadcast management server (not shown) via a broadcast channel. The broadcast channel may include a satellite channel or a terrestrial channel or some other type of communication channel. The broadcast management server may refer to a server that generates broadcast signals and/or broadcast-related information and transmits the generated broadcast signals and/or the generated broadcast-related information or the broadcast management server may refer to a server that receives and then transmits previously-generated broadcast signals and/or previously-generated broadcast-related information.

The broadcast-related information may include broadcast channel information, broadcast program information and broadcast service provider information.

The broadcast signal may include a TV broadcast signal, a radio broadcast signal, a data broadcast signal, and/or a combination of a data broadcast signal and either a TV broadcast signal or a radio broadcast signal.

The broadcast-related information may be provided to the mobile terminal 100 via a mobile communication network. In this case, the broadcast-related information may be received by the mobile communication module 113, rather than being received by the broadcast reception module 111.

The broadcast-related information may come in various forms, for example, an Electronic Program Guide (EPG) of a Digital Multimedia Broadcasting (DMB) format or an Electronic Service Guide (ESG) of a Digital Video Broadcast-Handheld (DVB-H) format.

The broadcast reception module 111 may receive broadcast signals using various broadcasting systems such as a Digital Multimedia Broadcasting-Terrestrial (DMB-T), a Digital Multimedia Broadcasting-Satellite (DMB-S), a Media Forward Link Only (MediaFLO), a Digital Video Broadcasting-Handheld (DVB-H), and an Integrated Services Digital Broadcast-Terrestrial (ISDB-T). The broadcast reception module 111 may be suitable for other types of broadcasting systems.

The broadcast signal and/or the broadcast-related information received by the broadcast reception module 1110 may be stored in the memory 160.

The mobile communication module 113 may transmit and receive wireless signals (or radio signals) to and from at least one of a base station, an external terminal, and a server through a mobile communication network. The wireless signals may include various types of data according to whether the mobile terminal 100 transmits/receives voice call signals, video call signals, and/or text/multimedia messages.

The wireless Internet module 115 may be a module for wirelessly accessing the Internet. The wireless Internet module 115 may be embedded in the mobile terminal 100 or may be installed in an external device.

The short-range communication module 117 may be a module for short-range communication. The short-range communication module 117 may use various short-range communication techniques such as Bluetooth, Radio Frequency Identification (RFID), Infrared Data Association (IrDA), Ultra wideband (UWB), and ZigBee.

The GPS module 119 may receive position information from a plurality of GPS satellites.

The A/V input unit 120 may receive audio signals or video signals. The A/V input unit 120 may include a camera 121 and a microphone 123. The camera 121 may process image frames such as still images or moving images captured by an image sensor during a video call mode or an image capturing mode. The image frames processed by the camera 121 may be displayed on a display module 151.

The image frames processed by the camera 121 may be stored in the memory 160 or may be transmitted to outside the mobile terminal 100 via the wireless communication unit 110. The mobile terminal 100 may include two or more cameras 121.

The microphone 123 may receive external sound signals during a call mode, a recording mode, and/or a voice recognition mode with the use of a microphone and may convert the sound signals into electrical sound data. In the call mode, the mobile communication module 113 may convert electrical sound data into data that can be readily transmitted to a mobile communication base station and then output the data obtained by the conversion. The microphone 123 may use various noise removal algorithms to remove noise generated during reception of external sound signals.

The user input unit 130 may generate key input data based on user input for controlling operation of the mobile terminal 100. The user input unit 130 may be implemented as a keypad, a dome switch, a touch pad (either static pressure or constant electricity), a jog wheel, a jog switch and/or a ringer mouse. When the user input unit 130 is implemented as a touch pad and forms a mutual layer structure along with the display module 151, the user input unit 130 and the display module 151 may be collectively referred to as a touch screen.

The sensing unit 140 may determine a current state (or configuration) of the mobile terminal 100 (e.g., an opened state or a closed state), a position or location of the mobile terminal 100 and/or whether the user is currently contacting (or touching) the mobile terminal 100. Based on such sensing, a sensing signal may be generated for controlling operation of the mobile terminal 100. For example, when the mobile terminal 100 is a slide-type mobile phone, the sensing unit 140 may sense or determine whether the mobile terminal 100 is in an open state or a closed state. The sensing unit 140 may also determine whether the mobile terminal 100 is being turned on by the power supply unit 190 and/or whether the interface unit 170 is connected to an external device.

The sensing unit 140 may include a proximity sensor 141. The proximity sensor 141 may detect an object that is nearby and is approaching the sensor 141. The proximity sensor 141 may determine whether there is an object nearby without any mechanical contact. The proximity sensor 141 may detect an object is nearby and approaching by detecting a variation in an alternating magnetic field or a rate of variation of static capacitance. The proximity sensor 141 may then provide a proximity signal. The sensing unit 140 may include two or more proximity sensors 141.

The output unit 150 may output audio signals, video signals and alarm signals. The output unit 150 may include the display module 151, an audio output module 153, and an alarm module 155.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display an image captured by the camera 121 or a received image or the display module 151 may display an image captured by the camera 121 or a received image at a same time.

If the display module 151 and the user input unit 130 form a mutual layer structure and are thus implemented as a touch screen, the display module 151 may be used not only as an output device but also as an input device. If the display module 151 is implemented as a touch screen, the display module 151 may also include a touch screen panel and a touch screen panel controller. The touch screen panel may be a transparent panel attached onto an exterior of the mobile terminal 100 and may be connected to an internal bus of the mobile terminal 100. The touch screen panel may monitor whether the touch screen panel is being touched by a user. Once touch input to the touch screen panel is detected, the touch screen panel may transmit a number of signals corresponding to the touch input to the touch screen panel controller. The touch screen panel controller may process the signals transmitted by the touch screen panel, and may transmit the processed signals to the controller 180. Then, the controller 180 may determine whether touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, and/or a broadcast reception mode or the audio output module 153 may output audio data present in the memory 160. The audio output module 153 may also output sound signals associated with functions of the mobile terminal 100 such as receiving a call or a message. The audio output module 153 may include a speaker and a buzzer, for example.

The alarm module 155 may output an alarm signal indicating occurrence of an event in the mobile terminal 100. Examples of the event may include receiving a call signal, receiving a message, and/or receiving a key signal. Examples of the alarm signal output by the alarm module 155 may include an audio signal, a video signal and/or a vibration signal. For example, the alarm module 155 may vibrate upon receiving a call signal, a message and/or a key signal, thereby notifying a user of occurrence of an event.

The display module 151 or the audio output module 153 may also output an alarm signal indicating occurrence of an event in the mobile terminal 100.

The memory 160 may store programs for operation of the controller 180. In addition, the memory 160 may temporarily store various data such as a phonebook, messages, still images, or moving images, for example.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage that performs functions of the memory 160 on the Internet.

The interface unit 170 may interface with an external device that can be connected to the mobile terminal 100. The interface unit 170 may be a wired/wireless headset, an external battery charger, a wired/wireless data port, a card socket (for a memory card or a subscriber identification module (SIM)/user identity module (UIM) card), an audio input/output (I/O) terminal, a video I/O terminal, and/or an earphone, for example. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control general operations of the mobile terminal 100 by controlling each of the elements of the mobile terminal 100. For example, the controller 180 may perform various control operations regarding making/receiving a voice call, transmitting/receiving data, and/or making/receiving a video call. The controller 180 may include a multimedia reproducing module 181 that plays multimedia data. The multimedia reproducing module 181 may be implemented as a hardware device and may be installed in the controller 180. The multimedia reproducing module 181 may also be implemented as a software program.

The power supply unit 190 may be supplied with power by an external power source or an internal power source and may supply power to other components in the mobile terminal 100.

An exterior of the mobile terminal 100 may now be described with reference to FIGS. 2 and 3. For ease of discussion, the mobile terminal 100 may be described as a slide-type mobile phone equipped with a front touch screen. However, embodiments of the present invention are not restricted to a slide-type mobile phone. Rather, embodiments of the present invention may be applied to various types of mobile phones, other than slide-type mobile phones.

Figure 2:
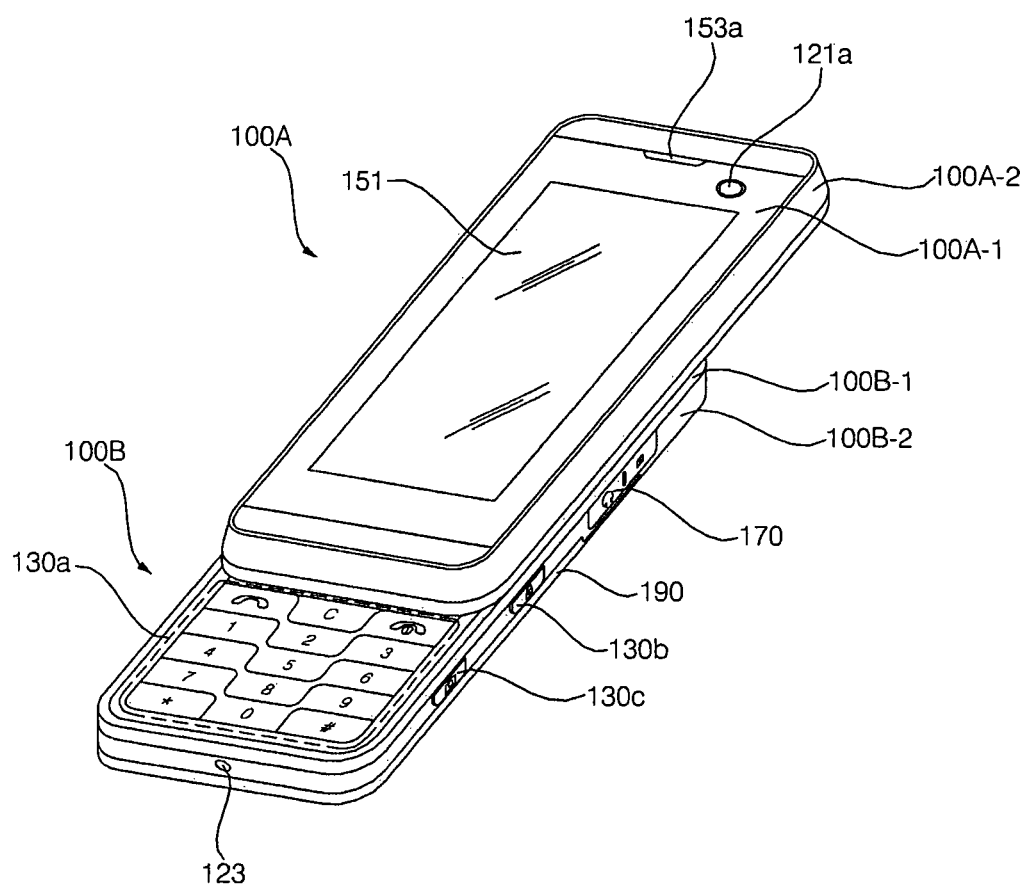
FIG. 2 illustrates a front view of the mobile terminal shown in FIG. 1.

FIG. 2 is a front view of the mobile terminal shown in FIG. 1. Other arrangements and configurations may also be provided. As shown in FIG. 2, the mobile terminal 100 may include a first body 100A and a second body 100B that may slide along the first body 100A in at least one direction.

When the first body 100A overlaps the second body 100B, the mobile terminal 100 may be considered to be in a closed state or a closed configuration. When the first body 100A exposes at least part of the second body 100B, the mobile terminal 100 may be considered to be in an open state or an open configuration.

When the mobile terminal 100 is in the closed state or configuration, the mobile terminal 100 may operate in a standby mode, and the mobile terminal 100 may be manually released from the standby mode by a user. When the mobile terminal 100 is in the open state or configuration, the mobile terminal 100 may operate in a call mode, and the mobile terminal may be placed in the standby mode either manually by a user or automatically after lapse of a predetermined amount of time.

The first body 100A may include a first front case 100A-1 and a first rear case 100A-2 that form the exterior of the first body 100A. Various electronic products may be installed in the empty space between the first front case 100A-1 and the first rear case 100A-2. One or more intermediate cases may be additionally provided between the first front case 100A-1 and the first rear case 100A-2.

The first front case 100A-1 and the first rear case 100A-2 may be formed of a synthetic resin through injection molding. The first front case 100A-1 and the first rear case 100A-2 may also be formed of a metal such as stainless steel (STS) or titanium (Ti).

The display module 151, a first audio output module 153a, and a first camera 121a may be provided in or on the first body 100A, and more particularly in the first front case 100A-1.

The display module 151 may include an LCD or an Organic Light Emitting Diode (OLED), or the like that visually display information.

A touch pad may be configured to overlap the display module 151 and realize a layer structure, and the display module 151 may operate as a touch screen. Thus, a user may input information to the display module 151 simply by touching the display module 151.

The first audio output module 153a may be implemented as a receiver or a speaker. The first camera 121a may be configured to capture a still image or a moving image of a user.

The second body 100B may include a second front case 100B-1 and a second rear case 100B-2 that form the exterior of the second body 100B.

A first user input module 130a may be disposed at a front of the second body 100B, and more particularly at a front of the second front case 100B-1. A second user input module 130c and the microphone 123 may be provided on or in the second front case 100B-1 or the second rear case 100B-2. A third user input module 130b may also be provided.

The first user input module 130a may receive a command for controlling the operation of the mobile terminal 100. The first user input module 130a may include an input key having functions of a mouse such as a joystick key, a touch pad, a trackball, a pointing stick, and/or a finger mouse, for example.

The first and second user input modules 130a and 130c may be collectively referred to as the user input unit 130. The user input unit 130 may adopt various manipulation methods as long as the user input unit 130 can provide tactile feedback to a user. For example, the user input unit 130 may be implemented as a dome switch or a touch pad that receives a command or information upon being pushed or touched by a user. The user input unit 130 may also be implemented as a wheel, a jog dial, and/or a joystick, for example.

The first user input module 130a may allow a user to input commands such as 'start', 'end', and 'scroll'. The first user input module 130a may also allow a user to input numbers, characters and/or symbols. The second user input module 130c may serve as a hot key for activating functions of the mobile terminal 100.

The microphone 123 may receive a voice of a user or other sounds. The interface unit 170 may allow the mobile terminal 100 to exchange data with an external device. For example, the interface unit 170 may be a connection terminal for connecting an earphone to the mobile terminal 100 in a wired or wireless manner, a port for short-range communication and/or a power supply terminal for supplying power to the mobile terminal 100.

The interface unit 170 may be a user authentication module such as a Subscriber Identification Module (SIM), a User Identity Module (UIM) and/or may be a card socket for an exterior-type card such as a memory card for storing data.

The power supply unit 190 may be inserted in the second rear case 100B-2 for supplying power to the mobile terminal. The power supply unit 190 may be a rechargeable battery that may couple to the second body 100B so as to be able to be attached to and/or detached from the second body 100B.

Figure 3:
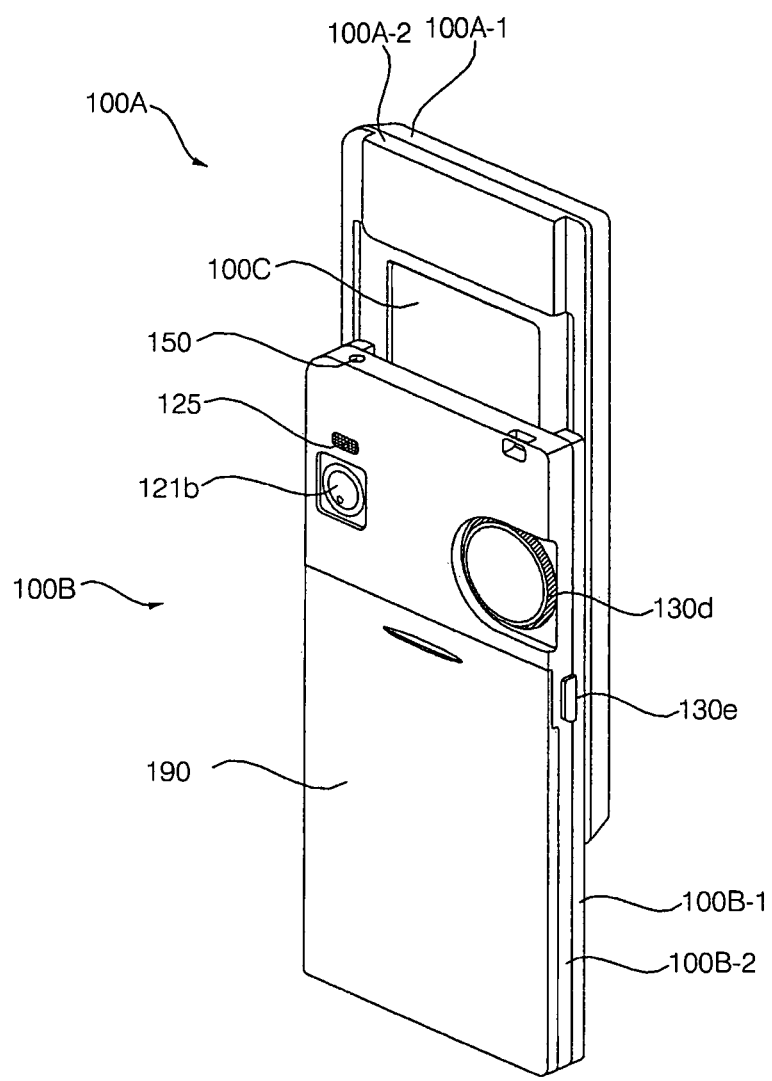
FIG. 3 illustrates a rear view of the mobile terminal shown in FIG. 2.

FIG. 3 is a rear view of the mobile terminal shown in FIG. 1. As shown in FIG. 3, a second camera 121b may be disposed at a rear of the second rear case 100B-2 of the second body 100B. The second camera 121b may have a different photographing direction than the first camera 121a shown in FIG. 2. In addition, a number of pixels of the second camera 121b may be different than a number of pixels of the first camera 121a.

The first camera 121a may be used to capture an image of a face of a user and then readily transmit the captured image during a video call. Thus, the first camera 121a may be a low-pixel camera module. The second camera 121b may be used to capture an image of an ordinary subject. The second camera 121b may be a high-pixel camera module.

A fourth user input module 130d may be provided at a rear of the second rear case 100B-2 of the second body 100B. The fourth user input unit 130d may be a wheel key. The third user input unit 130d may serve as a function key, such as a scroll key, for example.

A camera flash 125 may be provided near the second camera 121b. The camera flash 125 may illuminate a subject when the second camera 121b captures an image of the subject.

An antenna 150 for receiving a broadcast signal may be provided on one side of the second rear case 100B-2. The antenna 150 may be installed so as to be able to be pulled out from the second body 100B-2.

A slide module 100C may be disposed on the first rear case 100A-2 of the first body 100A. The slide module 100C may couple the first body 100A and the second body 100B so that the first body 100A can slide along the second body 100B.

The slide module 100C may be partially exposed by the second front case 100B-1.

A fifth user input module 130e may be provided on one side of the second rear case 100B-2. The fifth user input module 130e may allow a user to choose a predetermined function or may serve as an 'Enter' key. The fifth user input module 130e may also serve as a hot key for activating a predetermined function of the mobile terminal 100.

The second camera 121b is shown in FIG. 3 as being provided on the second body 100B, although embodiments of the present invention are not limited to this configuration.

At least one of the antenna 150, the second camera 121b and the camera flash 125 may be mounted on the first body 100A, and more particularly the first rear case 100A-2 of the first body 100A. In this case, the element mounted on the first rear case 100A-2 may be protected by the second body 100B when the mobile terminal 100 is closed. The first camera 121a may rotate and cover a photographing direction of the second camera 121a. Thus, the second camera 121b may be optional.

Figure 4:
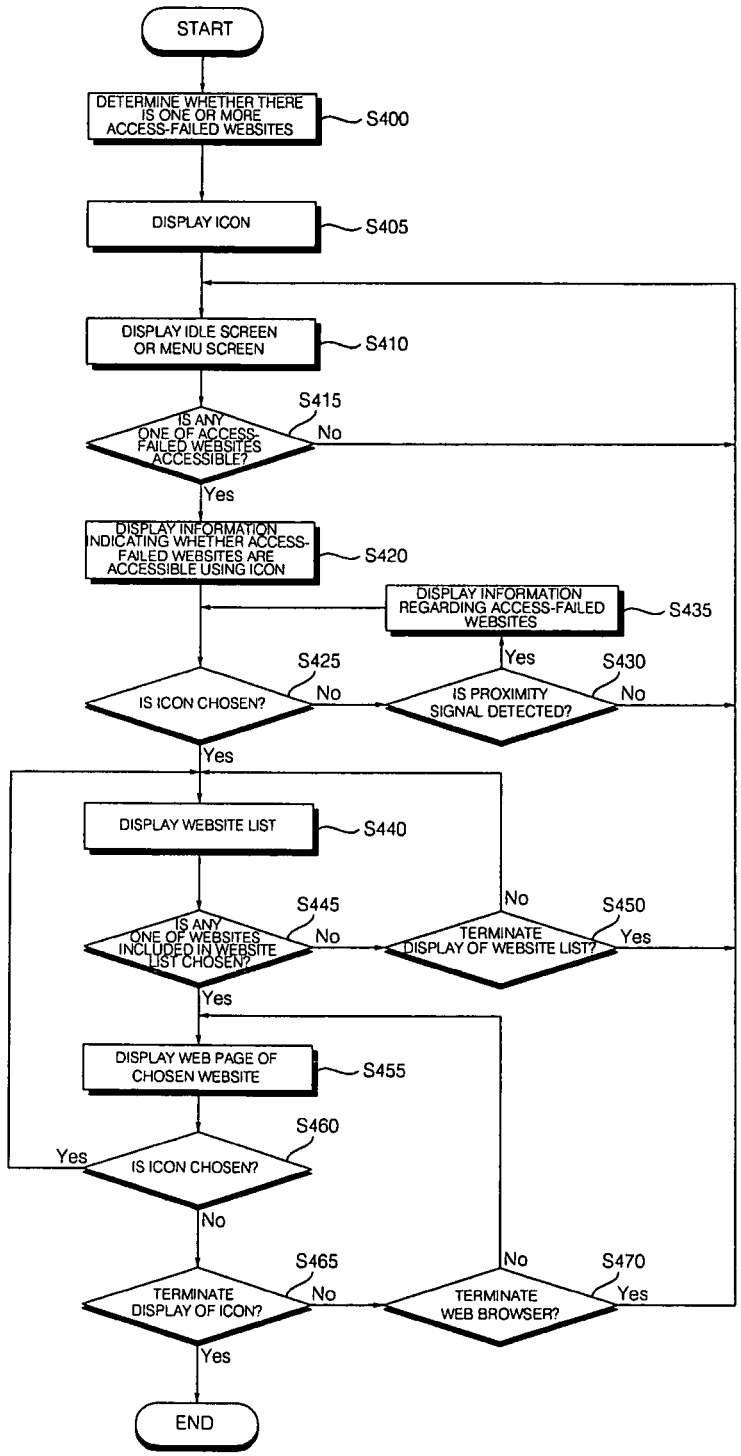
FIG. 4 is a flowchart of a method of controlling operation of a mobile terminal according to an example embodiment of the present invention.

FIG. 4 is a flowchart of a method of controlling operation of a mobile terminal according to an example embodiment of the present invention. Other operations, orders of operations and embodiments are also within the scope of the present invention. As shown in FIG. 4, the controller 180 may determine in operation S400 whether there are access-failed websites. Access-failed websites are websites that the mobile terminal 100 has previously failed to access because of an unstable connection to a web server, a website malfunction, and/or excessive traffic, for example. Other reasons may occur for an access-failed website.

The controller 180 may display results of the determination performed in operation S400 on a screen of the display module 151. The results may be displayed as an icon (such as an image or text) in operation S405. For example, the display module 151 may display a specific number of access-failed websites that are currently accessible by the mobile terminal 100 and a specific number of access-failed websites that are still inaccessible by the mobile terminal 100.

The controller 180 may display an idle screen or a menu screen according to user input in operation S410. The icon may be small-sized, and thus may be displayed by the display module 151 together with the idle screen or the menu screen.

The controller 180 may determine whether the access-failed websites are currently accessible in operation S415. The controller 180 may determine accessibility of the access-failed websites either repeatedly at regular intervals of time or only once at a predetermined time designated by a user. If the access-failed websites are all still inaccessible, the method may return to operation S410.

If any one of the access-failed websites is currently accessible in operation S415, the controller 180 may display information in operation S420 indicating results of the determination and also display the icon. For example, a thought balloon indicating a number or a list of access-failed websites that are currently accessible may be displayed along with the icon. Alternatively, a color or a shape of the icon may be altered in order to indicate that at least one of the access-failed websites are currently accessible. Information indicating results of the determination performed in operation S415 may be only temporarily displayed. The icon may be displayed whenever the number of access-failed websites that are currently accessible by the mobile terminal 100 or the number of access-failed websites that are still inaccessible by the mobile terminal 100 changes. The icon may be displayed at regular intervals of time, or the icon may be displayed whenever the mobile terminal 100 encounters a new access point (AP). A specific number of access-failed websites that are currently accessible and a specific number of access-failed websites that are still inaccessible may be determined whenever the new AP is encountered. The results may then be displayed.

The controller 180 may determine whether the icon is chosen (or selected) by the user in operation S425. The controller 180 may determine that the icon is chosen by the user when a touch signal for the icon is received.

If the determination in operation S425 is that the user has yet to select the icon, the controller 180 may determine in operation S430 whether a proximity signal is detected or provided (near the icon) by the proximity sensor 141. If no proximity signal is detected (near the icon) by the proximity sensor 141, the method may return to operation S410. On the other hand, if a proximity signal is detected (near the icon) by the proximity sensor 141 in operation S430, the controller 180 may temporarily redisplay information previously displayed in operation S420. For example, a thought balloon indicating the number or the list of access-failed websites that are currently accessible and the number or the list of access-failed websites that are still inaccessible may be temporarily displayed near the icon.

If the icon is determined in operation S425 to be chosen or selected by the user, the controller 180 may display a website list of access-failed websites that are currently accessible in operation S440. The website list displayed in operation S440 may include uniform resource locators (URLs), web page images or names of the access-failed websites that are currently accessible. Information in the website list may include one of website addresses, website names and images of websites. The controller 180 may also display a list of access-failed websites that are still accessible. The website list displayed in operation S440 may be updated at regular intervals of time or whenever the icon is selected by the user.

The controller 180 may determine, in operation S445, whether one of the websites included in the website list displayed in operation S440 is selected (or chosen) by the user.

If none of the websites included in the website list displayed in operation S440 are selected (or chosen) by the user, the controller 180 may determine, in operation S450, whether a command to terminate the display of the website list has been issued by the user. If a command to terminate the display of the website list displayed in operation S440 has been issued by the user, the controller 180 may stop displaying the corresponding website list, and the method may return to operation S410. On the other hand, when a command to terminate the display of the website list has not been issued by the user, the controller 180 may control the display module 151 to keep displaying the corresponding website list.

If one of the websites included in the website list (displayed in operation S440) is selected (or chosen) by the user, the controller 180 may access the selected (or chosen) website and display a web page of the chosen website in operation S455. The web page of the selected (or chosen) website may be displayed on the entire screen of the display module 151 or on part of the screen of the display module 151. Additionally, a new website list may be displayed that excludes the selected website.

The controller 180 may determine whether the icon is chosen (or selected) again by the user in operation S460. If the icon is chosen again by the user, the method may return to operation S440. On the other hand, if the icon has not been chosen (or selected) again since operation S425, the controller 180 may determine whether a command to terminate the display of the icon has been issued by the user in operation S465.

If it is determined in operation S465 that a command to terminate the display of the icon has been issued by the user, the controller 180 may stop displaying the icon. On the other hand, if it is determined in operation S465 that a command to terminate the display of the icon has not been issued by the user, the controller 180 may determine whether a command to terminate the display of the web page of the website chosen (or selected) by the user has been issued by the user in operation S470. If it is determined in operation S470 that a command to terminate the display of the web page of the website chosen by the user has not been issued by the user, the method may return to operation S455. On the other hand, if it is determined in operation S470 that a command to terminate the display of the web page of the website chosen or selected by the user has been issued by the user, the controller 180 may stop displaying the web page of the website chosen by the user, and the method may return to operation S410.

Figure 5:
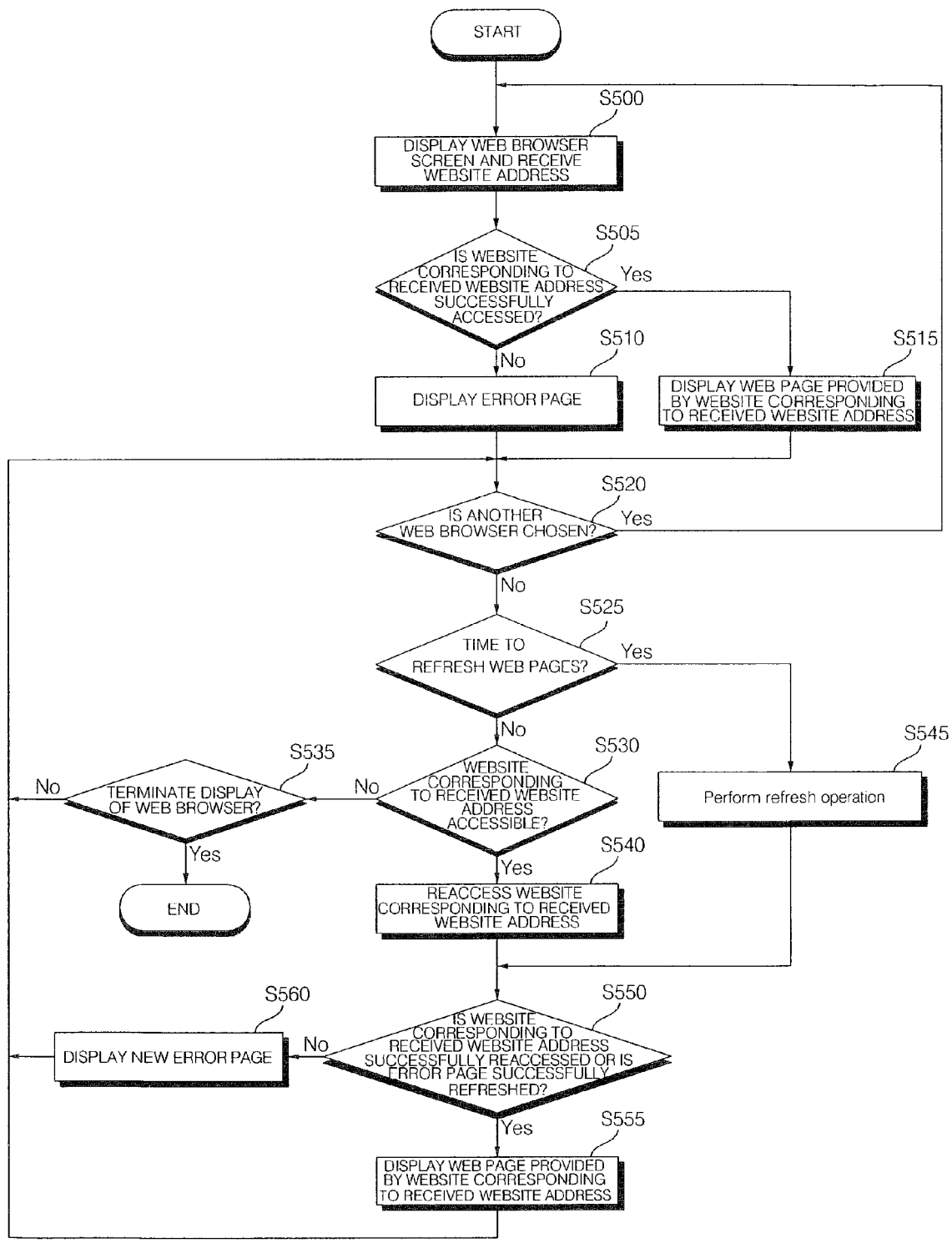
FIG. 5 is a flowchart of a method of controlling operation of a mobile terminal according to another example embodiment of the present invention.

FIG. 5 is a flowchart of a method of controlling operation of a mobile terminal according to an example embodiment of the present invention. Other operations, orders of operations and embodiments are also within the scope of the present invention.

As shown in FIG. 5, the controller 180 may display a web browser screen on the screen of the display module 151, and receive a website address through the web browser screen in operation S500. The controller 180 may determine whether the mobile terminal 100 successfully accesses a website corresponding to the received website address in operation S505. If the mobile terminal 100 has failed to access the website corresponding to the received website address, the controller 180 may display an error page in the web browser screen in operation S510. On the other hand, if the mobile terminal 100 successfully accesses the website corresponding to the received website address, the controller 180 may display, in operation S515, a web page of the website corresponding to the received website address in the web browser screen.

The controller 180 may determine whether another web browser has been chosen (or selected) by a user in operation S520. If it is determined, in operation S520, that another web browser has been chosen (or selected) by the user, the method may return to operation S500. The display module 151 may display a plurality of web pages or a plurality of error pages as thumbnails, for example. If it is determined, in operation S520, that another web browser has not yet been chosen (or selected) by the user, the controller 180 may determine, in operation S525, whether a time to refresh web pages has arrived. The refresh interval may vary from one web page to another web page. The refresh interval may be set so that a plurality of web pages displayed by the display module 151 can be refreshed at a same time.

If it is determined, in operation S525, that the time to refresh web pages has not yet arrived, the controller 180 may determine, in operation S530, whether the website corresponding to the received website address is still inaccessible. If it is determined in operation S530 that the website corresponding to the received website address is still inaccessible, the controller 180 may determine whether a command to terminate the display of the current web browser screen has been issued by the user in operation S535. If a command to terminate the display of the current web browser screen has not been issued by the user, the method may return to operation S520. On the other hand, if it is determined in operation S530 that the website corresponding to the received website address is currently accessible, the controller 180 may attempt to access the website corresponding to the received website address in operation S540.

If it is determined in operation S525 that the time to refresh web pages has arrived, the controller 180 may refresh the error page in the current web page screen in operation S545.

The controller 180 may determine whether the mobile terminal 100 has successfully refreshed the error page in the current web page screen or has successfully accessed the website corresponding to the received website address in operation S550. If the mobile terminal 100 has successfully refreshed the error page in the current web page screen or has successfully accessed the website corresponding to the received website address, the controller 180 may display, in operation S555, a web page of the website corresponding to the received website address in the current web browser screen. On the other hand, if the mobile terminal 100 has failed to refresh the error page in the current web page screen or has failed to access the website corresponding to the received website address, the controller 180 may display a new error page in the current web page screen in operation S560.

Figure 6:
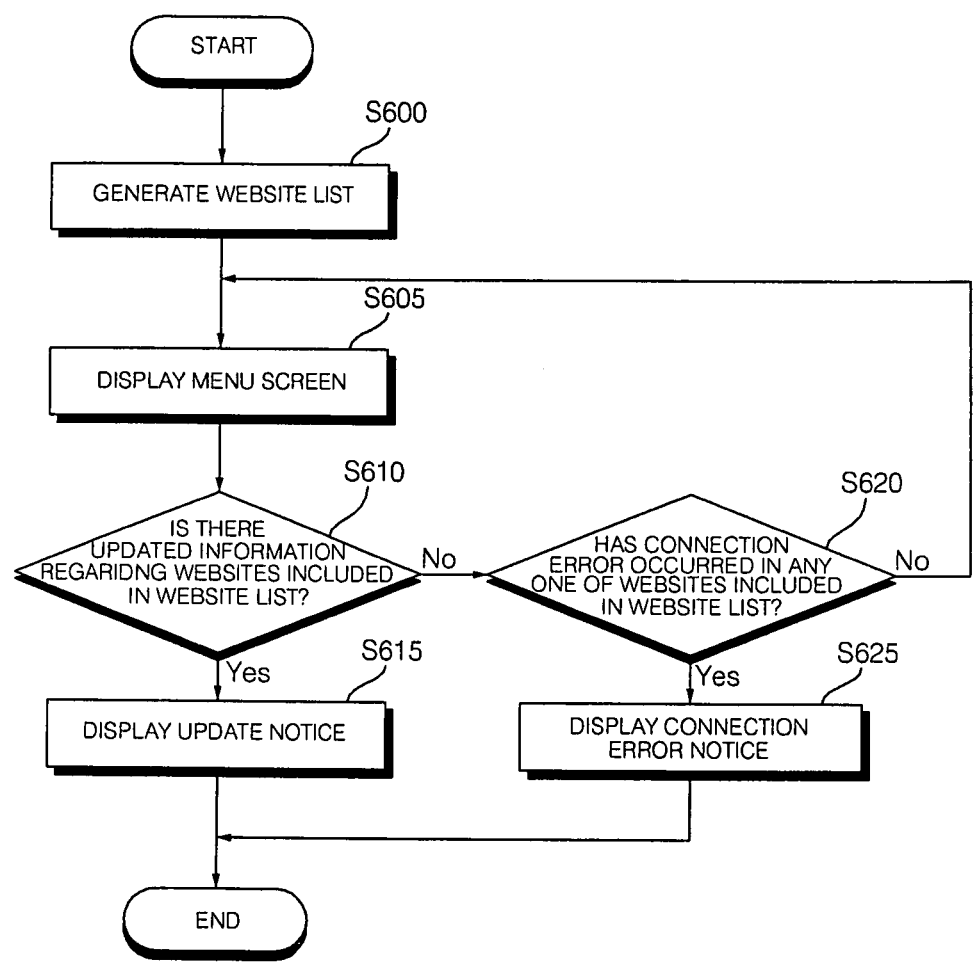
FIG. 6 is a flowchart of a method of controlling operation of a mobile terminal according to another example embodiment of the present invention.
Figure 7:
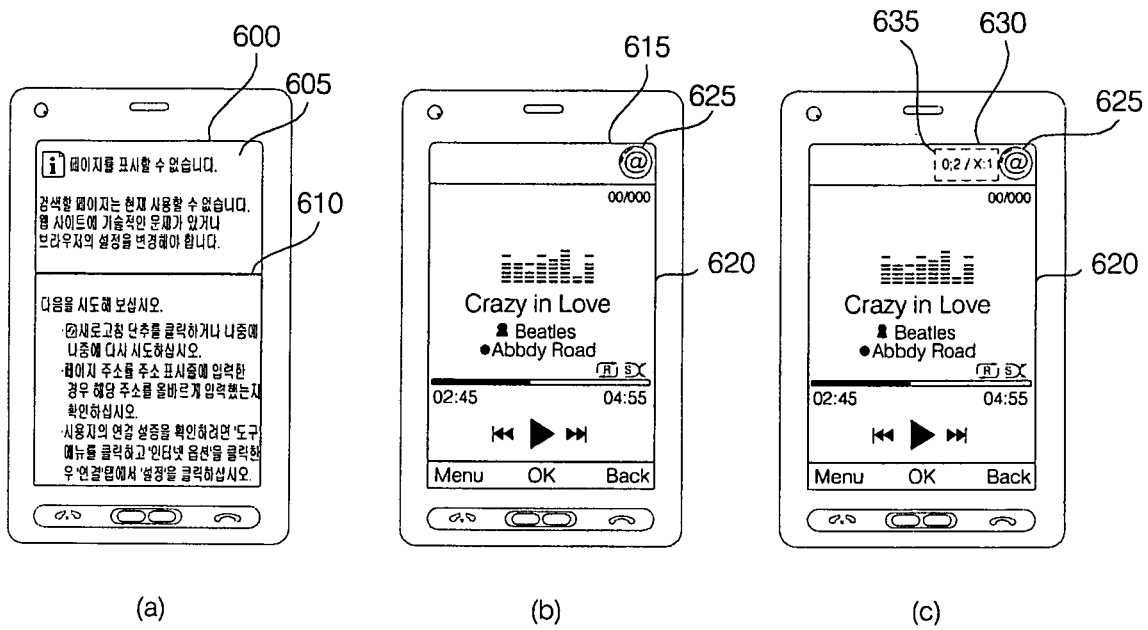
FIGS. 7-10 illustrate menu screens displayed by a mobile terminal according to example embodiments of the present invention.
Figure 8:
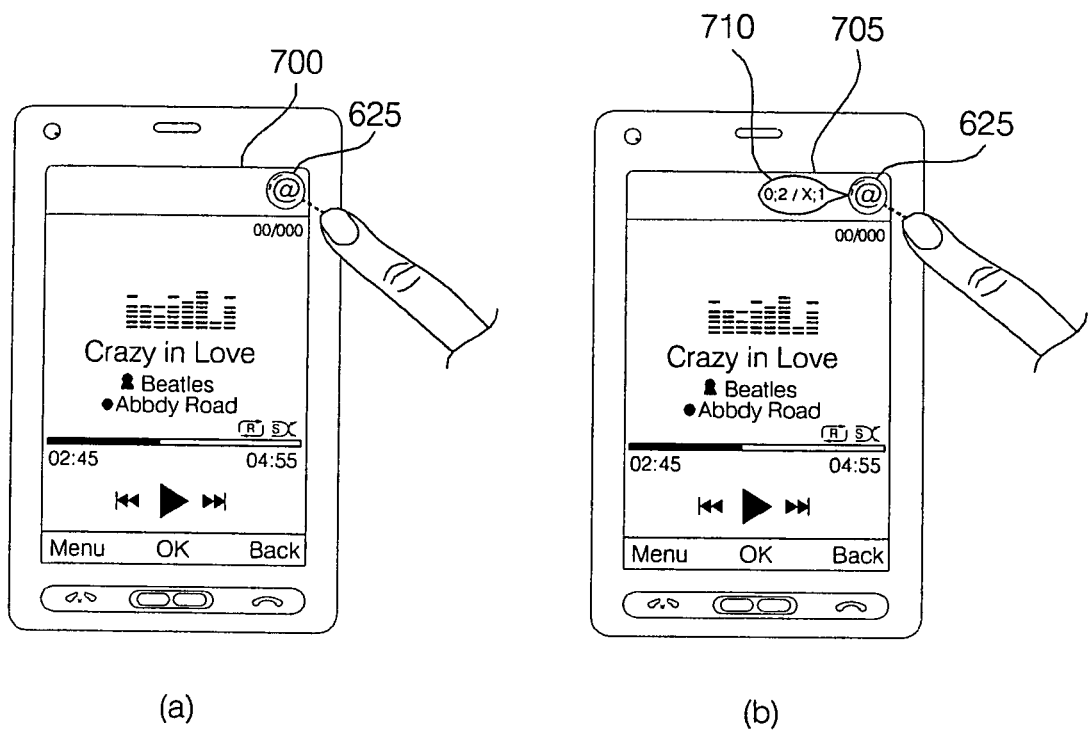
Figure 9:
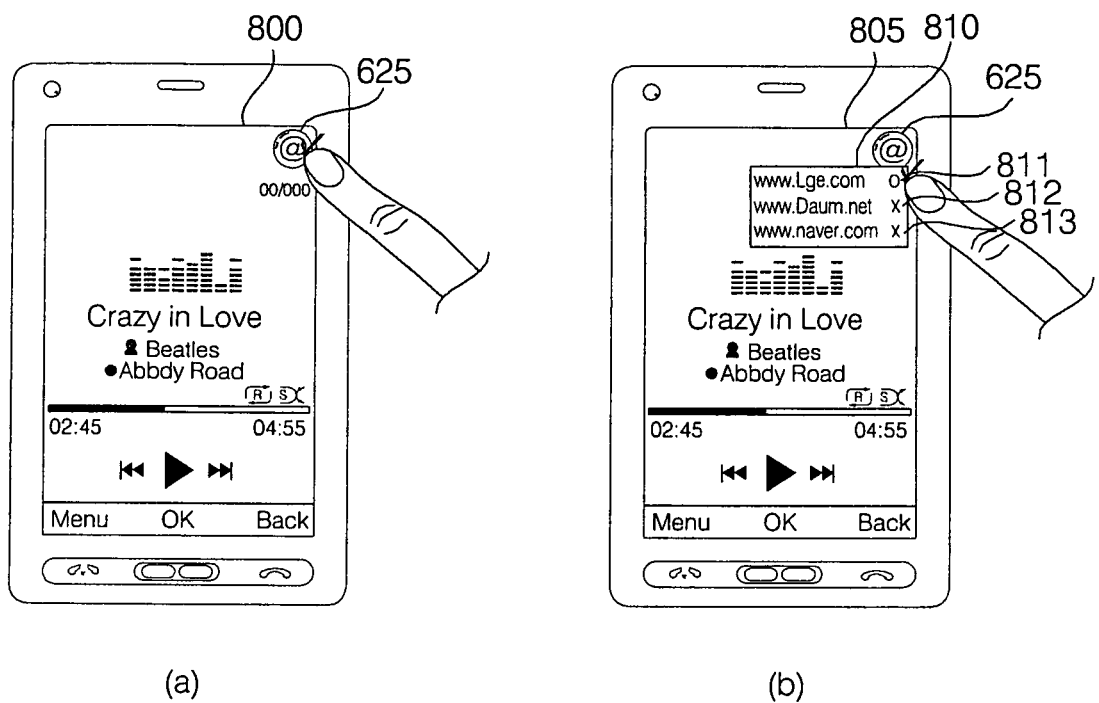
Figure 10:
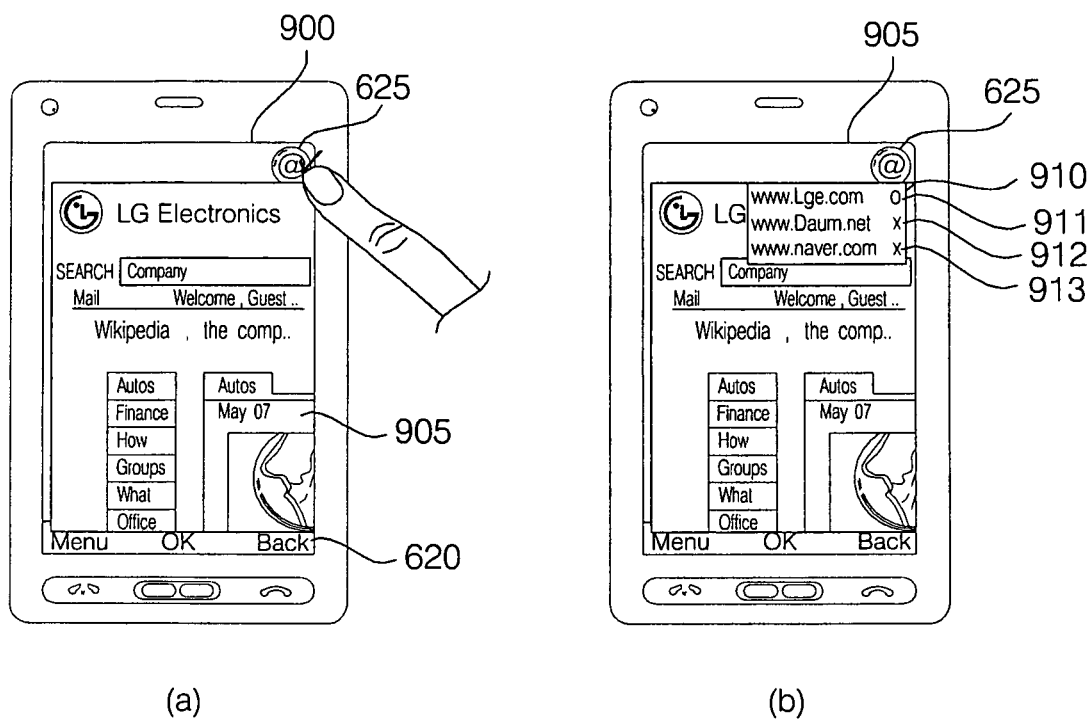

FIG. 6 is a flowchart of a method of controlling operation of a mobile terminal according to an example embodiment of the present invention. Other operations, orders of operations and embodiments are also within the scope of the present invention.

As shown in FIG. 6, the controller 180 may generate a list of websites in operation S600. The website list may include a plurality of websites that are registered in advance as Favorites or Bookmarks, a plurality of access-failed websites that the mobile terminal 100 has failed to access, a plurality of websites that have been recently accessed by a user, a plurality of websites that have been most frequently accessed by the user, a plurality of websites that require use of a certificate, and/or a plurality of websites from which the user has purchased paid services. The website list may be generated through a user setting or a default setting.

The controller 180 may execute a menu and display a menu screen on the screen of the display module 151 in operation S605. The menu screen may be a screen displayed when one of the menus provided by the mobile terminal 100 is executed or may be a web page screen provided by a website.

The controller 180 may determine, in operation S610, whether there are updated websites among the websites included in the website list. If there are updated websites among the websites included in the website list, the controller 180 may display an update not ice or message in operation S615 indicating that there are updated websites among the websites included in the website list on the screen of the display module 151. The controller 180 may output a vibration or an alarm sound, rather than the message, or the controller 180 may output the message, a vibration and an alarm sound at a same time in order to notify the user that there are updated websites among the websites included in the website list.

On the other hand, if none of the websites included in the website list are updated, the controller 180 may determine in operation S620 whether there are websites in which an access error has occurred among the websites included in the website list. The websites in which an access error has occurred may include websites that the mobile terminal 100 has failed to access due to excessive traffic, a firewall, and/or page shutdown, access-restricted websites, and websites that the mobile terminal 100 has failed to properly use due to a routine or urgent inspection of the websites or an urgent notice from the websites. If it is determined in operation S620 that none of the websites included in the website list are inaccessible websites, the method may return to operation S605. On the other hand, if it is determined in operation S620 that there are inaccessible websites among the websites included in the website list, the controller 180 may control the display module 151 to display a connection error notice message indicating that there are inaccessible websites among the websites included in the website list in operation S625. The controller 180 may output a vibration or an alarm sound, rather than the message, in order to notify the user of the existence of inaccessible websites among the websites included in the website list.

The connection error may occur due to at least one of access restrictions, an urgent inspection of websites, an urgent notice from websites, excessive traffic, a firewall and web page shutdown. The update notice or the connection notice may be provided by at least one of a vibration and an alarm sound.

FIGS. 7-10 illustrate menu screens displayed by a mobile terminal and for explaining the method shown in FIG. 4. As shown in FIG. 7(a), if the mobile terminal 100 fails to access a website corresponding to a website address received from a user, a screen image 600 including a web browser screen 605 and an error page 610 may be displayed. If a user executes a menu when the screen image 600 is displayed, a screen image 615 including a menu screen 620 may be displayed, as shown in FIG. 7(b). Since there is a website that the mobile terminal 100 has failed to access, an icon 625 may be displayed along with the menu screen 620, as shown in FIG. 7(b). Thereafter, it may be determined whether the website corresponding to the received website address is still inaccessible.

If the website corresponding to the received website address is currently accessible, then a screen image 630 including predetermined information 635 may be displayed, as shown in FIG. 7(c). The predetermined information 635 may include a number of websites that the mobile terminal 100 has failed to access and a number of access-failed websites that are currently accessible. The predetermined information 635 may be temporarily displayed near the icon 625. The predetermined information 635 shown in FIG. 7(c) may indicate that there are three websites that the mobile terminal 100 has failed to access, and that two of the three websites are currently accessible. The predetermined information 635 may be displayed as text, as shown in FIG. 7(c). Alternatively, a color or a shape of the icon 625 may be altered to indicate whether the access-failed websites are currently accessible.

If a proximity signal from the proximity sensor 141 is detected or provided (near the icon 625) when a screen image 700 including the menu screen 620 and the icon 625 is displayed, as shown in FIG. 8(a), after the predetermined information 635 disappears from the screen image 630 of FIG. 7(c), a thought balloon 710 may be displayed on a screen image 705 near the icon 625 as shown in FIG. 8(b). The thought balloon 710 may indicate the number of websites that the mobile terminal 100 has failed to access and the number of access-failed websites that are currently accessible. The thought balloon 710 may be continuously displayed until no proximity signal from the proximity sensor 141 (near the icon 625) is detected.

If a touch signal for the icon 625 is received when a screen image 800 including the menu screen 620 and the icon 625 is displayed, as shown in FIG. 9(a), a screen image 805 including the menu screen 620 and a website list 810 may be displayed, as shown in FIG. 9(b). The website list 810 may include first website information 811 regarding a first website, second website information 812 regarding a second website, and third website information 813 regarding a third website. As shown in FIG. 9(b), the website list 810 may indicate that the first and second websites are currently accessible by the mobile terminal 100, and that the third website is currently inaccessible by the mobile terminal 100.

If a touch signal for one of the websites included in the website list 810, for example, the first website, is received when the screen image 805 is displayed, a screen image 900 including the menu screen 620, the icon 625 and a web page 905 corresponding to the first website may be displayed, as shown in FIG. 10(a). If a touch signal for the icon 625 is received when the screen image 900 is displayed, a screen image 905 including the menu screen 620, the icon 625 and a website list 910 may be displayed, as shown in FIG. 10(b). The website list 910 may be an updated version of the website list 810 shown in FIG. 8(b) that includes updated information regarding accessibility of the first, second and third websites. The website list 910 may include first website information 911 regarding a first website, second website information 212 regarding a second website and third website information 913 regarding a third website. The website list 910 may indicate that the first website is currently accessible by the mobile terminal 100, and that the second and second websites are currently inaccessible by the mobile terminal 100.

Figure 11A:
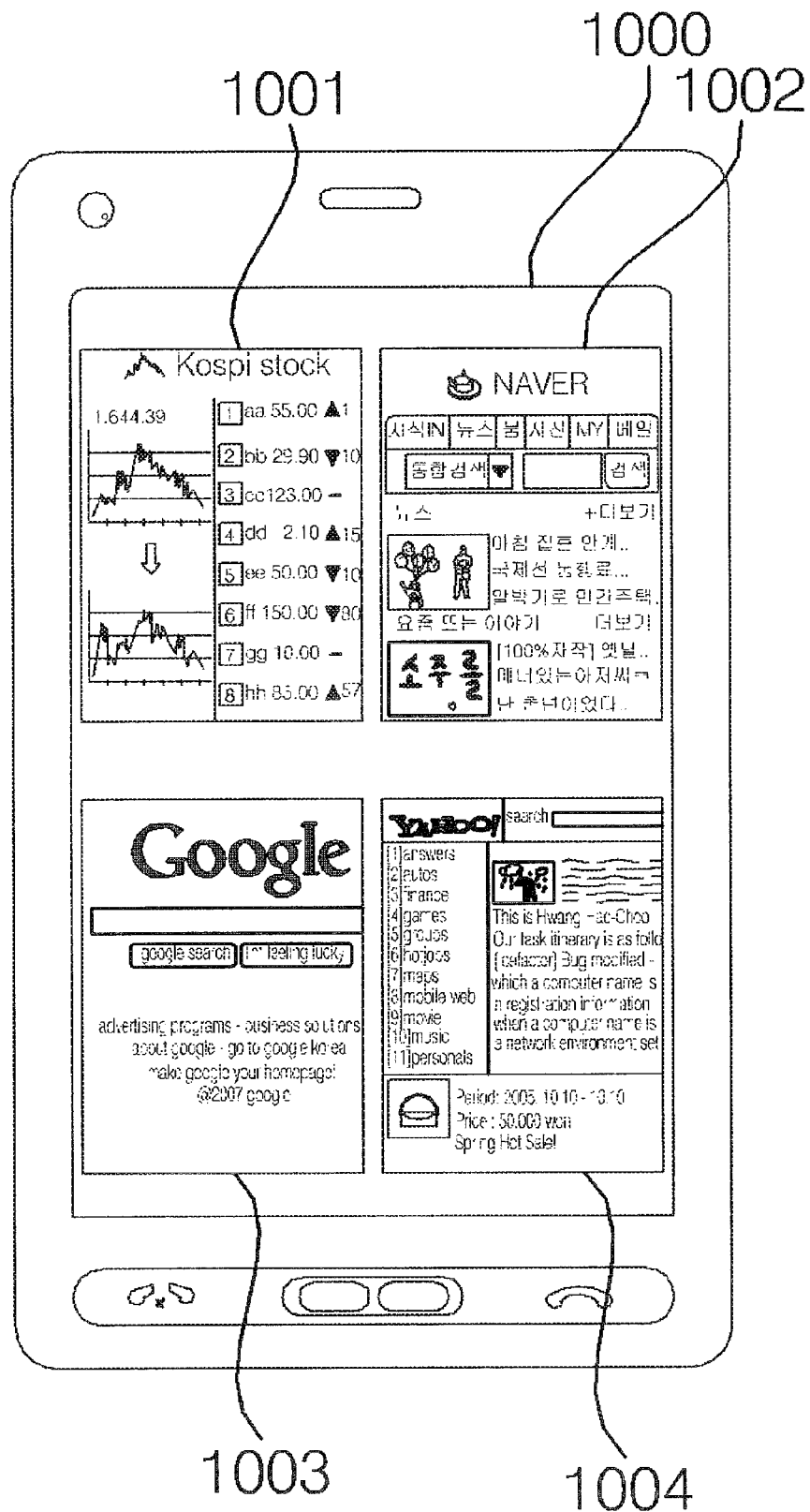
FIGS. 11 and 12 illustrate menu screens displayed by a mobile terminal according to example embodiments of the present invention.
Figure 11B:
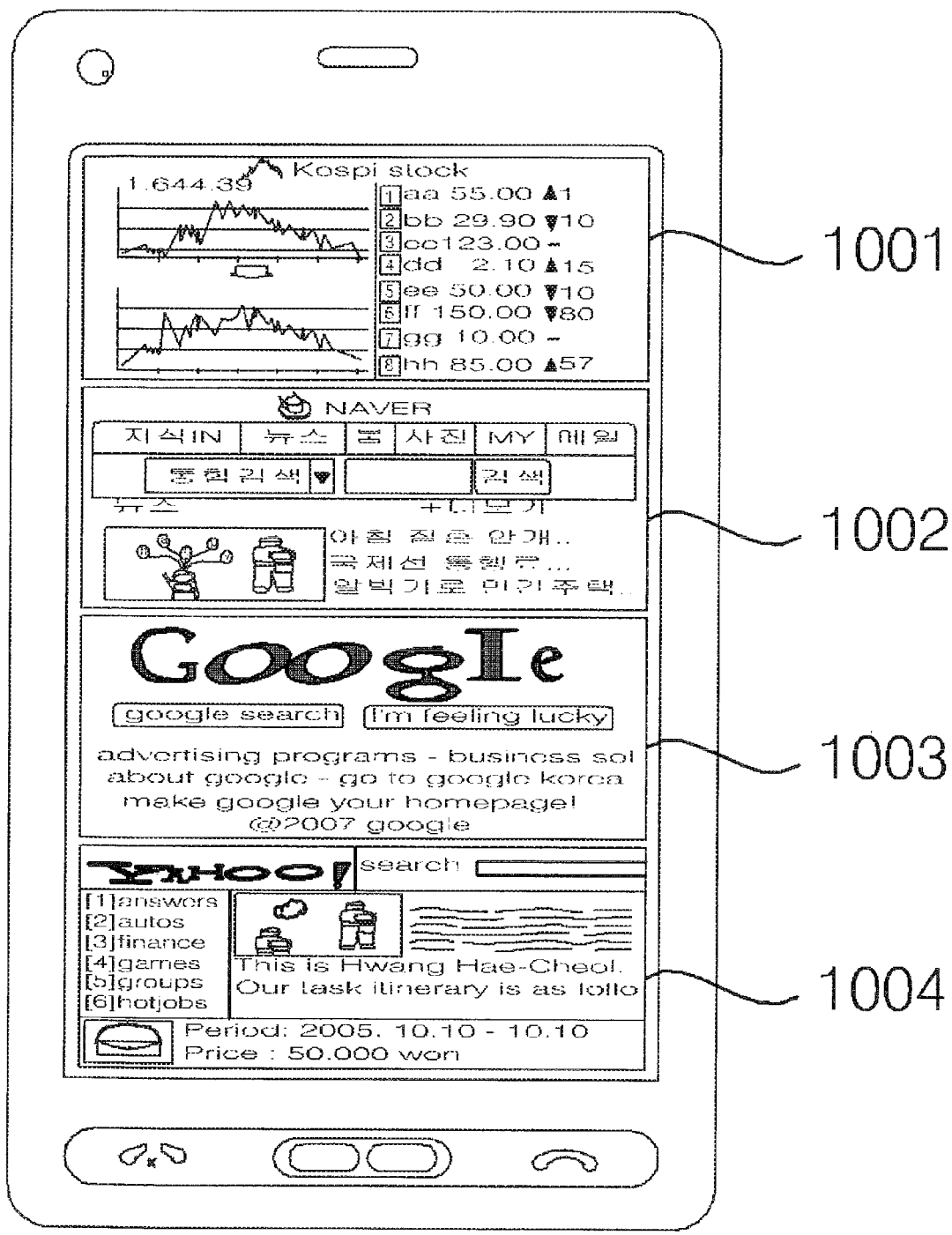

FIGS. 11 and 12 illustrate menu screens displayed by a mobile terminal and for explaining the method shown in FIG. 5. As shown in FIG. 11(a), a screen image 1000 including four web browser screens 1001-1004 may be displayed. The web browser screens 1001-1004 may be displayed as thumbnails. A web page or an error page may be displayed in each of the web browser screens 1001-1004. The web browser screens 1001-1004 may be displayed along one column, as shown in FIG. 11(b).

Figure 12A:
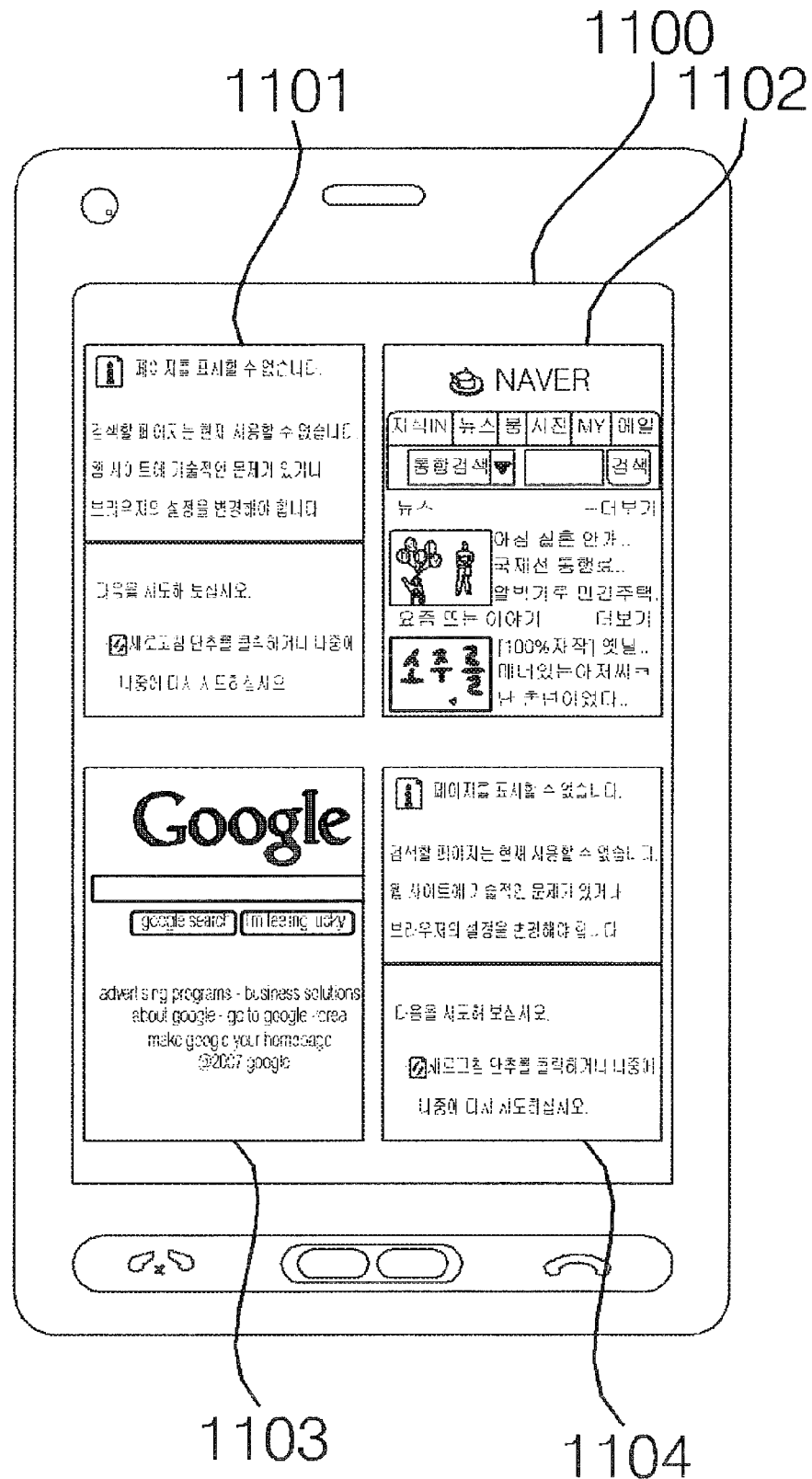
Figure 12B:
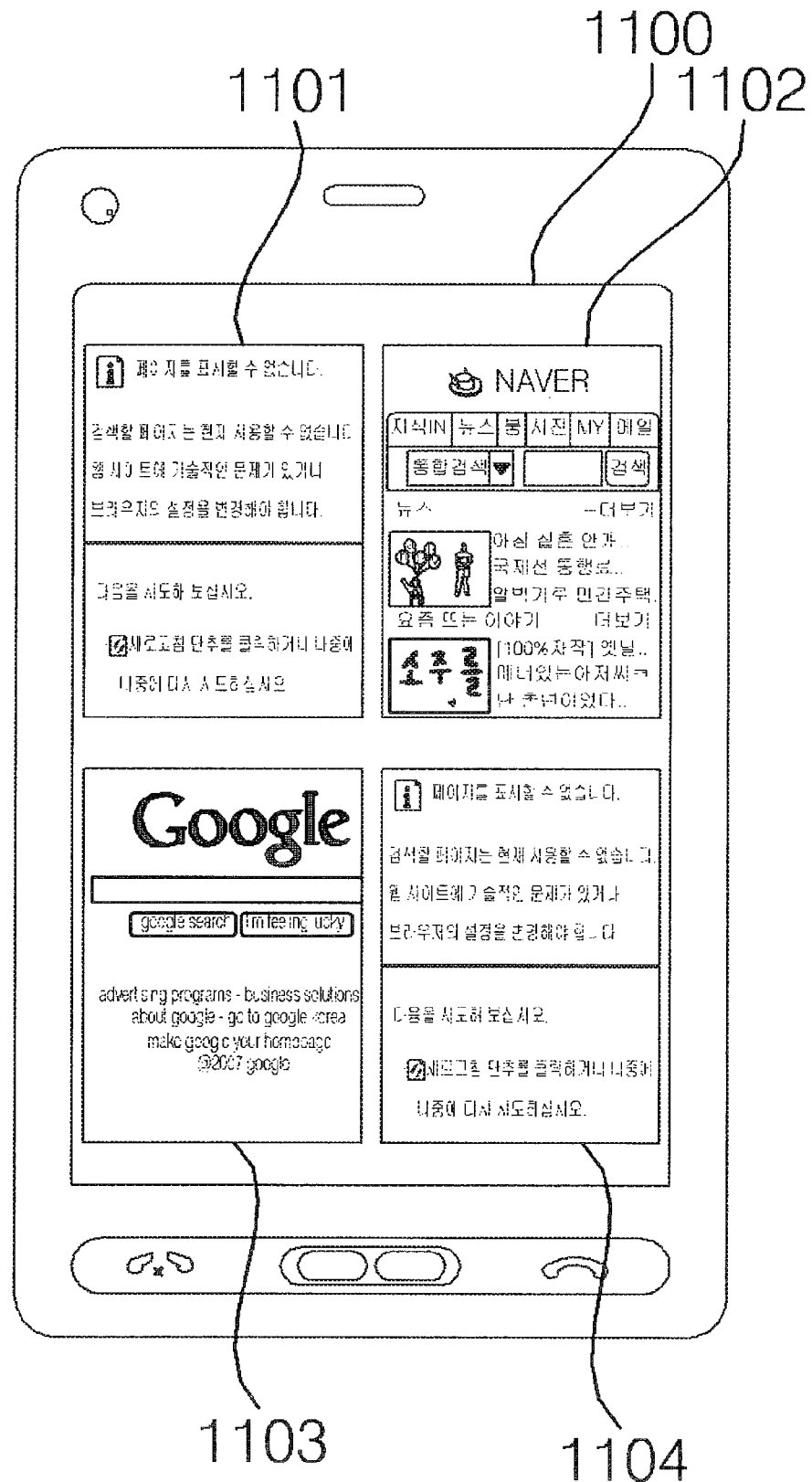
Figure 12C:
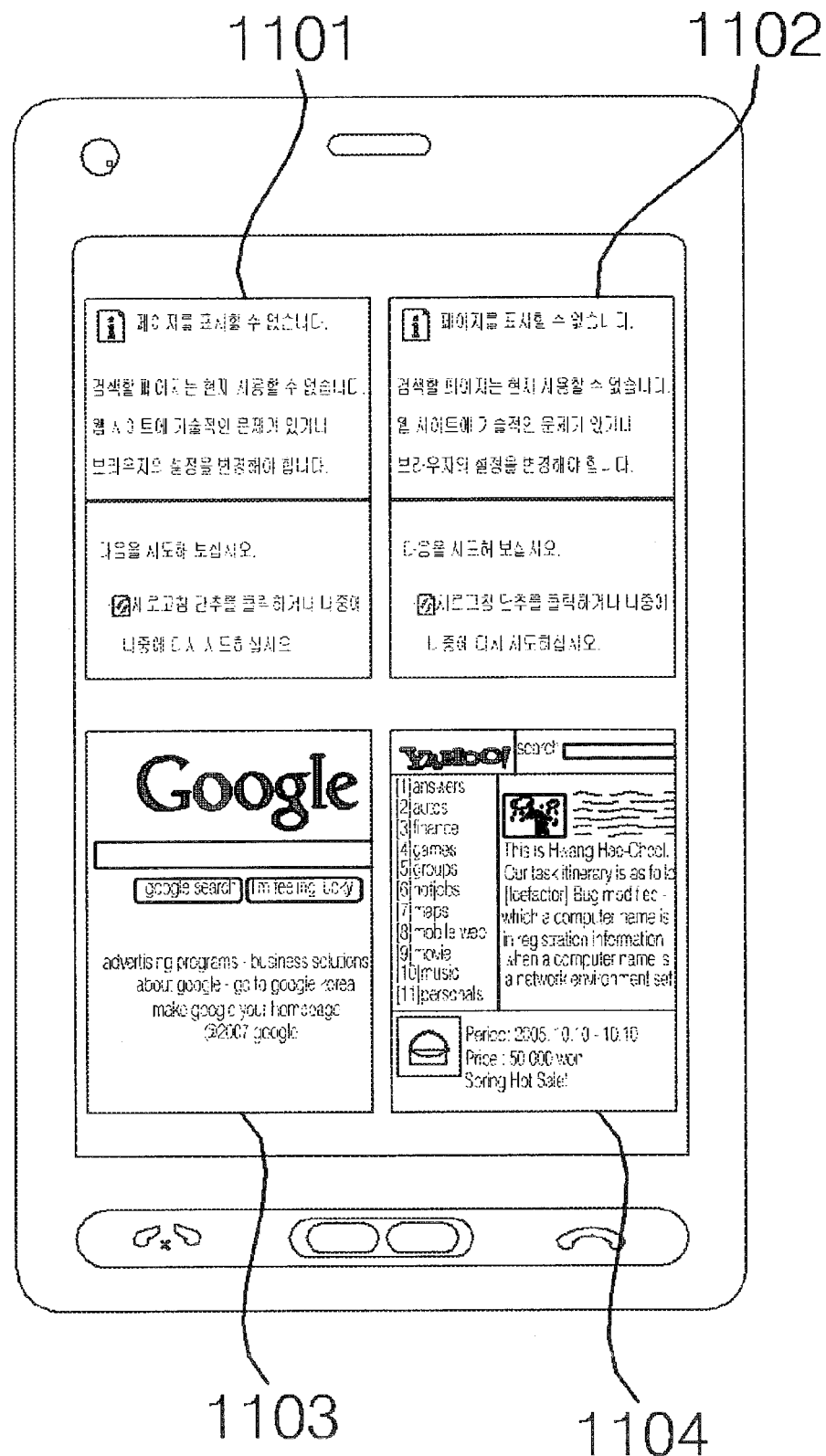

As shown in FIG. 12(a), a screen image 1100 including first through fourth web browser screens 1101-1104 may be displayed. The first through fourth web browser screens 1101-1104 may be displayed as thumbnails. An error page may be displayed in each of the first and fourth web browser screens 1101 and 1104, and two different web pages may be displayed in the second and third web browser screens 1102 and 1103, respectively. If a web site corresponding to the error page displayed in the fourth web browser screen 1104 is determined to be accessible by the mobile terminal 100, the web site corresponding to the error page displayed in the fourth web browser screen 1104 may be accessed, and thus a web page provided by the web site corresponding to the error page displayed in the fourth web browser screen 1104 may be displayed in the fourth web browser screen 1104, as shown in FIG. 12(b). If a web site corresponding to the error page displayed in the first web browser screen 1101 is still inaccessible by the mobile terminal 100, an error page may be displayed in the first web browser screen 1101, as shown in FIG. 12(c).

If a time to refresh web pages arrives, the error page or the web page displayed in each of the first through fourth web browser screens 1101-1104 may be refreshed. However, if the mobile terminal 100 loses its connection to a website corresponding to each of the first through fourth web browser screens 1101-1104, the web page or the error page displayed in each of the first through fourth web browser screens 1101-1104 may not be properly refreshed. In this case, a new error page may be displayed in each of the first through fourth web browser screens 1101-1104. For example, with reference to FIG. 12(c), the web page displayed in each of the third and fourth web browser screens 1103 and 1104 may be properly refreshed. On the other hand, the error page or the web page displayed in each of the first and second web browser screens 1101 and 1102 may not be properly refreshed, and thus a new error page may be displayed in each of the first and second web browser screens 1101 and 1102.

Figure 13:
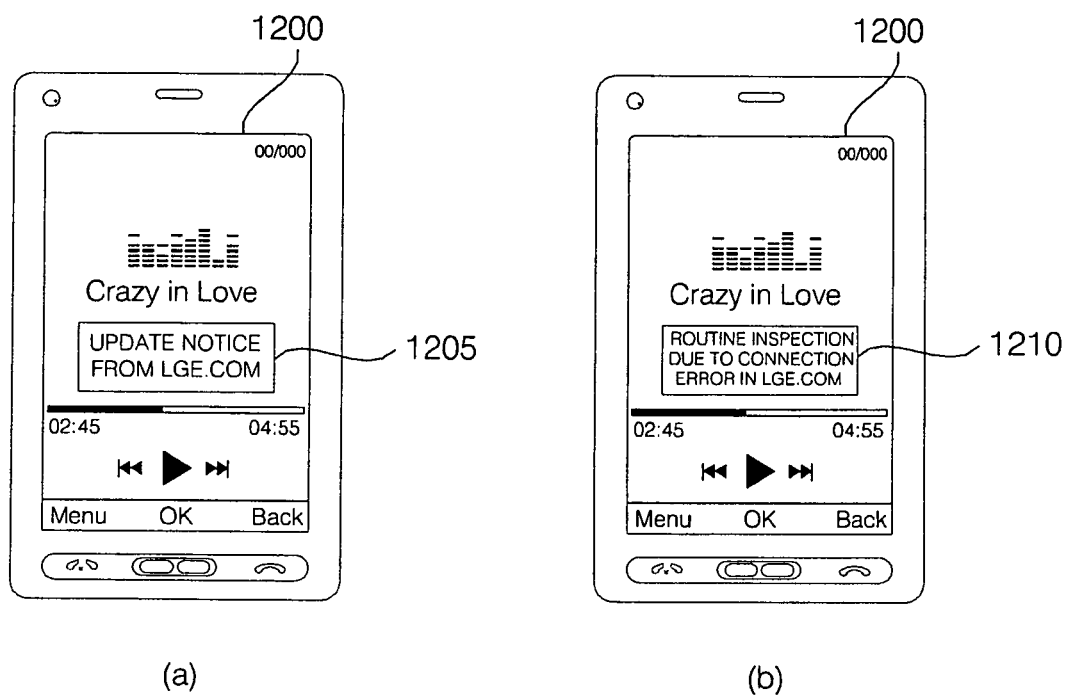
FIG. 13 illustrates menu screens displayed by a mobile terminal according to example embodiments of the present invention.

FIG. 13 illustrates menu screens displayed by a mobile terminal and for explaining the method shown in FIG. 6. As shown in FIG. 13(a), a screen image 1200 including a music play screen is displayed. If a website list generated through a user setting or a default setting is updated, an update notice 1205 including updated information regarding the website list may be displayed in the screen image 1200. If a connection error occurs in any one of a plurality of websites included in the website list, a connection error notice 1210 identifying the type of the connection error and the website in which the connection error occurs may be displayed in the screen image 1200.

Embodiments of the present invention may be realized as computer-readable code written on a computer-readable recording medium included in a mobile terminal such as a mobile station modem (MSM). The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

Embodiments of the present invention may allow a user to conveniently use web browsing services with his/her mobile terminal by determining whether websites that the user has failed to access are currently accessible and readily notify the user of updates in websites of his/her interest.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a mobile terminal, the method comprising:
    displaying an operation screen on a display module of the mobile terminal;
    determining whether there is at least one access-failed website, wherein the at least one access-failed website is a website that the mobile terminal previously failed to access;
    displaying an icon on a portion of the operation screen when at least one access-failed website is determined, the displayed icon to indicate that there is the at least one access-failed website;
    periodically determining whether the at least one access-failed website is currently accessible by the mobile terminal;
    in response to the determining that at least one access-failed website is currently accessible, displaying an indicator on an outer area of the displayed icon for a predetermined time period and removing the displayed indicator from the operation screen after the predetermined time period has passed, the displayed indicator to notify a user of the mobile terminal that the at least one access-failed website is currently accessible by the mobile terminal;
    when a proximity signal is detected from a proximity sensor in response to a user input approaching near the icon, temporarily redisplaying the removed indicator on the outer area of the displayed icon, the indicator being a thought balloon indicating a number of the access-failed websites that are currently accessible and a number of the access-failed websites that are still inaccessible;
    in response to selection of the icon displayed on the display module, displaying a website list on the display module that includes information of the access-failed website that is currently accessible; and
    displaying a web page corresponding to a selected website when one of currently accessible websites included in the website list is selected, and then displaying a new website list that excludes the selected website on the display module when the icon is selected again while displaying the web page.

2. The method of claim 1, wherein the information includes one of a website address, a website name and an image of a website.

3. The method of claim 1, wherein the website list displayed on the display module includes information of at least one access-failed website that is still inaccessible.

4. The method of claim 1, wherein the icon displayed on the display module indicates whether a change occurs to an access-failed website that is currently accessible or whether a change occurs to an access-failed websites that is still inaccessible.

5. The method of claim 1, wherein the website list displayed on the display module comprises at least one of uniform resource locators (URLs) and images of the access-failed websites that are currently accessible.

6. The method of claim 1, further comprising:
    periodically determining a specific number of access-failed websites that are currently accessible and a specific number of access-failed websites that are still inaccessible to the mobile terminal and displaying results of the determining on the outer area of the displayed icon.

7. The method of claim 1, further comprising:
    determining a specific number of access-failed websites that are currently accessible to the mobile terminal and a specific number of access-failed websites that are still inaccessible to the mobile terminal whenever a new access point is encountered, and displaying results of the determining on the inner area or the outer area of the displayed icon.

8. A mobile terminal comprising:
    a memory;
    a wireless Internet module configured to access a website;
    a display module configured to display an operation screen related to a function of the mobile terminal;
    a proximity sensor configured to provide a proximity signal; and
    a controller configured to:
        determine whether there is at least one access-failed website, wherein the at least one access-failed website is a website that the mobile terminal previously failed to access,
        display an icon on a portion of the operation screen when the at least one access-failed website is determined, the icon to indicate that there is the at least one access-failed website,
        periodically determine whether at least one access-failed website is currently accessible by the mobile terminal,
        display an indicator on an outer area of the displayed icon for a predetermined time period and removing the displayed indicator from the operation screen after the predetermined time period has passed, in response to the determination that at least one access-failed website is currently accessible, the indicator to notify a user of the mobile terminal that the at least one access-failed website is currently accessible by the mobile terminal,
        when the proximity signal is detected from the proximity sensor in response to a user input approaching near the displayed icon, temporarily redisplay the removed indicator the outer area of the displayed icon the indicator being a thought balloon indicating a number of the access-failed websites that are currently accessible and a number of access-failed websites that are still inaccessible,
        display a website list on the display module that includes information of the access-failed website that is currently accessible, in response to a selection of the icon displayed on the display module, and
        display a web page corresponding to a selected website when one of currently accessible websites included in the displayed website list is selected, and then display a new website list that excludes the selected website on the display module when the icon is selected again while displaying the web page.

9. The mobile terminal of claim 8, wherein the information includes one of a website address, a website name and an image of a website.

10. The mobile terminal of claim 8, wherein when a touch signal for the icon is received by the controller, the controller controls the display module to display a website list that includes a specific number of access-failed websites that are still inaccessible.

11. The mobile terminal of claim 8, wherein the controller controls the display module to display the icon to indicate that one of the access-failed websites that are currently accessible has changed or that one of the access-failed websites that are still inaccessible has changed.

12. The mobile terminal of claim 8, wherein the website list displayed on the display module comprises at least one of uniform resource locators (URLs) and images of the access-failed websites that are currently accessible.

13. The mobile terminal of claim 8, wherein the controller periodically determines a specific number of access-failed websites that are currently accessible and a specific number of access-failed websites that are still inaccessible, and the controller controls the display module to display results of the determining.

14. The mobile terminal of claim 8, wherein the controller determines the specific number of access-failed websites that are currently accessible by the mobile terminal and a specific number of access-failed websites that are still inaccessible by the mobile terminal whenever a new access point is encountered and the controller controls the display module to display results of the determining.

15. The mobile terminal of claim 8, wherein the website list is displayed on the display module while the icon is still displayed on the display module.

16. The mobile terminal of claim 8, wherein a color or a shape of the displayed icon changes when another access-failed website becomes currently accessible by the mobile terminal.

17. The mobile terminal of claim 8, wherein the website list displayed on the display module further includes information of an access-failed website that is currently inaccessible by the mobile terminal.

18. The method of claim 1, wherein the website list is displayed on the display module while the icon is still displayed on the display module.

19. The method of claim 1, wherein a color or a shape of the displayed icon changes when another access-failed website becomes currently accessible by the mobile terminal.

20. The method of claim 1, wherein the website list displayed on the display module further includes information of an access-failed website that is currently inaccessible by the mobile terminal.

21. A method of a mobile terminal, the method comprising:
 displaying an operation screen on a display module of the mobile terminal;
 determining that the mobile terminal fails to access a website;
 displaying an icon on a portion of the operation screen in response to the determining that the mobile terminal fails to access the website, the icon to indicate that there is at least one access-failed website;
 periodically determining that the at least one access-failed website is currently accessible by the mobile terminal;
 in response to the determining that the at least one access-failed website is currently accessible by the mobile terminal, displaying an indicator on an outer area of the displayed icon for a predetermined time period and removing the displayed indicator from the operation screen after the predetermined time period passes, the indicator to notify a user of the mobile terminal that at least the access-failed website is currently accessible by the mobile terminal;
 when a proximity signal is detected from a proximity sensor in response to a user input approaching near the icon, temporarily redisplaying the removed indicator on the outer area of the displayed icon, the indicator being a thought balloon indicating a number of the access-failed websites that are currently accessible and a number of the access-failed websites that are still inaccessible;
 in response to receiving the selection of the icon displayed on the display module, displaying a website list on the display module that includes first information of the access-failed website that is currently accessible and second information of another access-failed website that is currently inaccessible; and
 displaying a web page corresponding to a selected website in response to selection of one of currently accessible websites included in the displayed website list, and then displaying, on the display module, a new website list that excludes the selected website in response to another selection of the displayed icon while displaying the web page.

22. The method of claim 21, wherein the website list is displayed on the mobile terminal while the icon is still displayed on the display module.

23. The method of claim 21, wherein a color or a shape of the displayed icon changes when another access-failed website becomes currently accessible by the mobile terminal.

24. The method of claim 6, wherein displaying the results of the determining on the inner area or the outer area of the displayed icon includes displaying the specific number that represents the access-failed websites that are currently accessible and displaying the specific number that represents the access-failed websites that are still inaccessible.

25. The method of claim 7, wherein displaying the results of the determining on the outer area of the displayed icon includes displaying the specific number that represents the access-failed websites that are currently accessible and displaying the specific number that represents the access-failed websites that are still inaccessible.

26. The mobile terminal of claim 13, wherein the controller controls the display module to display results of the determining includes the controller controls the display module to display the specific number that represents the access-failed websites that are currently accessible and to display the specific number that represents the access-failed websites that are still inaccessible.

27. The mobile terminal of claim 14, wherein the controller controls the display module to display results of the determining includes the controller controls the display module to display the specific number that represents the access-failed websites that are currently accessible and to display the specific number that represents the access-failed websites that are still inaccessible.

* * * * *